(12) United States Patent
Carrera et al.

(10) Patent No.: US 8,503,958 B2
(45) Date of Patent: Aug. 6, 2013

(54) SIGNAL PROCESSOR AND METHOD FOR PROCESSING A RECEIVING SIGNAL

(75) Inventors: Alfonso Carrera, San Sebastian (ES); Stefan Koehler, Nuremberg (DE); Guenter Rohmer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1086 days.

(21) Appl. No.: 12/305,689

(22) PCT Filed: Jun. 20, 2007

(86) PCT No.: PCT/EP2007/005451
§ 371 (c)(1),
(2), (4) Date: Jan. 22, 2009

(87) PCT Pub. No.: WO2008/000383
PCT Pub. Date: Jan. 3, 2008

(65) Prior Publication Data
US 2010/0297975 A1  Nov. 25, 2010

(30) Foreign Application Priority Data
Jun. 27, 2006 (DE) .......................... 10 2006 029 486

(51) Int. Cl.
*H04B 1/18* (2006.01)
(52) U.S. Cl.
USPC ....................................... 455/188.1; 455/552
(58) Field of Classification Search
USPC ....................................................... 455/188.1
See application file for complete search history.

(56) References Cited

U.S. PATENT DOCUMENTS

| | | | |
|---|---|---|---|
| 5,493,721 A | 2/1996 | Reis | |
| 5,610,984 A | 3/1997 | Lennen | |

(Continued)

FOREIGN PATENT DOCUMENTS

| | | |
|---|---|---|
| EP | 0 499 827 A2 | 8/1992 |
| WO | 97/14052 A1 | 4/1997 |

(Continued)

OTHER PUBLICATIONS
Carrera et al.: "Receiver and Method for Receiving a First Usable Frequency Band and a Second Usable Frequency Band," U.S. Appl. No. 12/306,295, filed Dec. 23, 2008.

(Continued)

*Primary Examiner* — Ajibola Akinyemi
(74) *Attorney, Agent, or Firm* — Keating & Bennett, LLP

(57) ABSTRACT

A signal processor for processing a receiving signal having a first usable frequency band and a second usable frequency band includes a first mixer for mixing the receiving signal with a first local oscillator signal, wherein a frequency of the first local oscillator signal is asymmetrical between the first usable frequency band and the second usable frequency band. The first mixer is implemented to obtain an in-phase signal and a quadrature signal, having a first signal portion representing a mixed image of the first usable frequency band, and having a second signal portion representing a mixed image of the second usable frequency band. The signal processor comprises a second mixer) for mixing the in-phase signal and the quadrature signal by using the second local oscillator signal. A frequency of the second local oscillator signal is selected such that the mixed image of the first usable frequency band and the mixed image of the second usable frequency band are at least partly image bands of each other with regard to the second local oscillator signal. The second mixer is implemented to separately provide information content of the first usable frequency band and the second usable frequency band at its output, for obtaining a first output signal, which substantially comprises information content of the first usable frequency band, and for obtaining a second output signal which substantially comprises information content of the second usable frequency band.

22 Claims, 4 Drawing Sheets

U.S. PATENT DOCUMENTS

| | | |
|---|---|---|
| 6,243,430 B1 | 6/2001 | Mathe |
| 2002/0161522 A1 | 10/2002 | Cohen et al. |
| 2002/0173337 A1 * | 11/2002 | Hajimiri et al. ............... 455/552 |
| 2006/0046773 A1 | 3/2006 | Aycin et al. |

FOREIGN PATENT DOCUMENTS

| | | |
|---|---|---|
| WO | WO 9714052 A1 * | 4/1997 |
| WO | 01/39364 A1 | 5/2001 |
| WO | WO 0139364 A1 * | 5/2001 |

OTHER PUBLICATIONS

Official communication issued in International Application No. PCT/EP2007/005451, mailed on Sep. 17, 2007.

Martin: "Complex Signal Processing Is Not Complex," IEEE Transactions on Circuits and Systems-I: Regular Papers; vol. 51; No. 9; Sep. 2004; pp. 1823-1836.

Mirabbasi et al.: "Hierarchical QAM: A Spectrally Efficient DC-Free Modulation Scheme," Circuit for Communications; IEEE Communications Magazine; Nov. 2000; pp. 140-146.

* cited by examiner

SIGNAL PROCESSOR AND METHOD FOR PROCESSING A RECEIVING SIGNAL

BACKGROUND OF THE INVENTION

The present invention generally relates to a signal processor and a method for processing a receiving signal, particularly to a broadband dual receiver with dual conversion and low intermediate frequency.

Nowadays, it is desirable or necessitated, respectively, in many applications that several usable frequency bands are received at the same time. For example, in the field of satellite-aided positioning it is useful to evaluate signals in two usable frequency ranges spaced apart from each other for improving spatial resolution. Apart from this, in the field of mobile communication it is, also sometimes desirable to receive and evaluate signals in two different frequency bands simultaneously or alternatively.

Dual receivers allow simultaneous reception of two different bands by a single receiver, which saves power consumption and costs.

In currently used receivers for the above-described applications, for example for simultaneously receiving two bands in a satellite-aided navigation system, there are two different groups: very broadband receivers and relatively narrowband dual receivers. Both of them are high-precision receivers for high-end navigating and positioning systems.

In the first type of receivers, high precision (for example with regard to positioning) is obtained by the large bandwidth of the transmission method DSSS (direct-sequence spread spectrum). For example, a bandwidth in a range from 20 MHz up to 70 MHz or more is used. Processing such a high bandwidth is a great challenge for the receiver. A high bandwidth mainly affects filtering and group run-time changes in a pass range of the filters, a cutoff frequency of a variable gain amplifier (also referred to as VGA) and a sampling rate of an analog/digital converter (also referred to as ADC). Based on the high necessitated bandwidth or the high cutoff frequency, respectively, for example, an anti-alias filter (which is, for example, upstream of the analog/digital converter) is implemented in a passive manner. The variable gain amplifier (VGA) and the analog/digital converter (ADC) consume a comparatively high amount of current (due to the high signal bandwidth to be processed).

In a second type of receivers, high precision is obtained by simultaneously receiving two bands or frequency bands, respectively. By this method, among other things, an ionospheric group run-time change (representing a negative influence variable in a navigation system or satellite-based positioning system) is compensated by measuring two delays from two different carrier frequencies. However, receiver architectures conventionally used for receiving two frequency bands have, like broadband receivers, a comparatively complex circuit structure and comparatively high current consumption.

SUMMARY

According to an embodiment, a signal processor for processing a receiving signal with a first usable frequency band and a second usable frequency band for obtaining two output signals may have: a first mixer for mixing the receiving signal with a first local oscillator signal, wherein a frequency of the first local oscillator signal is asymmetrical between the first usable frequency band and the second usable frequency band, and wherein the first mixer is implemented to obtain an in-phase signal and a quadrature signal having a first signal portion representing a mixed image of the first usable frequency band, and having a second signal portion representing a mixed image of the second usable frequency band; and a second mixer for mixing the in-phase signal and the quadrature signal using a second local oscillator signal, wherein a frequency $f_{LO2}$ of the second local oscillator signal is selected such that the mixed image of the first usable frequency band generated by the first mixer and the mixed image of the second usable frequency band generated by the first mixer are at least partly image bands of each other with regard to the second local oscillator signal, wherein the second mixer is implemented to separately provide information content of the first usable frequency band and the second usable frequency band at its output in order to obtain a first output signal, which substantially comprises information content of the first usable frequency band, and to obtain a second output signal, which substantially comprises information content of the second usable frequency band.

According to another embodiment, a method for processing a receiving signal with a first usable frequency band and a second usable frequency band may have the steps of: mixing the receiving signal with a first local oscillator signal, wherein a frequency of the first local oscillator signal is asymmetrical between the first usable frequency band and the second usable frequency band, for obtaining an in-phase signal and a quadrature signal having a first signal portion representing a mixed image of the first usable frequency band, and having a second signal portion representing a mixed image of the second usable frequency band; and mixing the in-phase signal and the quadrature signal by using a second local oscillator signal, wherein a frequency of the second local oscillator signal is selected such that the mixed image of the first usable frequency band and the mixed image of the second usable frequency band are at least partly image bands of each other with regard to the second local oscillator signal, wherein mixing is performed for separately providing information content of the first usable frequency band and the second usable frequency band.

According to a central idea of the present invention, the inventive frequency planning, i.e. the inventive selection of frequencies of the first local oscillator and the second local oscillator, allows common processing of the two usable frequency ranges within a single signal path, wherein the resulting intermediate frequencies are particularly low. By generating both an in-phase signal and a quadrature signal, it also becomes possible to image the two usable frequency bands to a very low, common intermediate frequency range in the second mixture, wherein it is still ensured that the information content of the two usable frequency bands can be separated again.

The inventive structure of a signal processor reduces the effort for image frequency suppression, since the image of the first usable frequency band generated by the first mixer and the image of the second usable frequency band generated by the first mixer are at least partly image bands of each other with regard to the frequency of the second local oscillator signal. Thus, it is merely necessitated to separate the image of the first usable frequency band and the image of the second usable frequency band during the second mixture, whereby separate image frequency suppression is no longer necessitated. If, however, as it is the case in the prior art, the image of the first usable frequency band generated by the first mixture and the image of the second usable frequency band generated by the first mixture were no image bands of each other, it will be necessitated to implement image frequency suppression in the second mixture, and further to additionally obtain a separation of the information content of the first usable frequency band and the second usable frequency band. In other words, the inventive architecture of the signal processor performs image frequency suppression and separation of the information content of the two usable frequency bands during the second mixture in a combined manner, which significantly reduces the circuit complexity and thus the power consumption compared to conventional solutions.

Thus, the inventive signal processor has the advantage that broadband image frequency suppression is obtained with little effort. Further, two usable frequency bands are processed in a single signal path. Due to the inventive selection of the frequencies of the local oscillator signals, particularly low intermediate frequencies are obtained during simultaneous processing of the two usable frequency bands, which reduces the demands on the respective amplifier and the analog/digital converter. The low intermediate frequencies and the low necessitated sampling frequency of the analog/digital converter also results in a particularly low current consumption of the inventive structure.

Additionally, it should be noted that the inventive architecture of a signal processor is particularly well suited for monolithic integration, for example by using CMOS technology. Further, due to the inventive architecture of signal processing, only a single frequency synthesizer is necessitated, which generates the first local oscillator signal, since the first local oscillator signal serves both for frequency conversion of the information content of the first usable frequency band as well as the information content of the second usable frequency band. This further reduces both the circuit complexity and the current consumption of the inventive circuitry compared to conventional solutions.

All in all, it has to be stated that the inventive signal processor allows complete suppression of the image frequencies occurring within a two-stage frequency conversion, while at the same time a current consumption lower than in conventional circuitries is ensured. The usage of complex active band passes can, for example, be omitted due to the inventive frequency planning.

In one embodiment, the frequency of the first local oscillator signal is selected such that the first usable frequency band and the second usable frequency band are imaged to non-overlapping or spaced-apart frequency bands by the mixer. Thus, the first usable frequency band and the second usable frequency band are imaged to frequency-separated frequency bands after mixing. This allows positioning of the frequency of the second local oscillator signal between the images of the first usable frequency band and the second usable frequency band.

In a further embodiment, one of the following relations applies for a frequency $f_1$ describing a band center of the first usable frequency band, for a frequency $f_2$ describing a band center of the second usable frequency band and for the frequency $f_{LO1}$ of the first local oscillator:

$$f_2+0,15(f_1-f_2) \leq f_{LO1} \leq f_2+0,35(f_1-f_2)$$

or $$f_2+0,65(f_1-f_2) \leq f_{LO1} \leq f_2+0,85(f_1-f_2).$$

Here, it is assumed that the frequency $f_2$ is smaller than the frequency $f_1$.

By the respective selection of the frequency of the first local oscillator signal, it is ensured that image bands of the first usable frequency band and the second usable frequency band in the receiving signal are as distant as possible from the first usable frequency band and the second usable frequency band, and can thus be removed in a very efficient manner by a pre-selection filter.

In a further embodiment, the frequency of the second local oscillator signal is selected such that the frequency of the second local oscillator signal differs from the average value of a center frequency of the first signal portion and a center frequency of the second signal portion by 20% at the most. Such a selection ensures a very low second intermediate frequency. Additionally, this also ensures that the information content of the first usable frequency band and the information content of the second usable frequency band can be separated from each other with very good insulation, since by the above-mentioned selection of the frequency of the second local oscillator signal, the first signal portion and the second signal portion are arranged around the second local oscillator signal in a sufficiently asymmetrical manner with regard to frequency.

In a further embodiment, the signal processor is implemented to sample the first output signal or a signal derived therefrom with a sampling frequency, and to convert the same from analog to digital for obtaining a first digitalized signal, and to sample the second output signal or a signal derived therefrom with the sampling frequency and convert the same from analog to digital for obtaining a second digitalized signal. Advantageously, the sampling frequency deviates from a four-fold of an intermediate frequency to which the second mixer images the image of the first usable frequency band generated by the first mixer and the image of the second usable frequency band generated by the first mixer by 20% at the most. It has been shown that the above-mentioned selection of the sampling frequency allows a further frequency conversion from the second intermediate frequency level, to which the second mixer images the information content of the first usable frequency band and the information content of the second usable frequency band, to a base band in a very efficient and precise manner. Apart from this, it has been shown that by selecting the sampling frequency as a four-fold of the second intermediate frequency, sub-sampling can be reliably avoided, since the bandwidth of the signal resulting after the second mixture (i.e. after mixing by the second mixer) is limited towards the top to twice the second intermediate frequency.

Thus, in a further embodiment, the signal processor is thus implemented to mix the first digitalized signal down to a base band, and to mix the second digitalized signal down to a base band. Here, it is advantageous to set every second sample of the signal values of the first digitalized output signal to zero or to remove the same, and to weight the other samples alternately by +1 or −1 for obtaining an in-phase output signal. Further, it is advantageous to set every second sample from the first digitalized output signal, temporally offset by one sampling step compared to the calculation of the first in-phase signal, to zero or to remove the same, and to weight the other samples alternately with +1 or −1 for obtaining a first quadrature output signal. The above-mentioned processing achieves that both an in-phase signal and a quadrature signal are generated from the first digitalized output signal. Very simple processing results by setting every second sample to zero and by alternately weighting the other samples with values inverse to each other (e.g. alternately by +1 and −1). At the same time, the respective weighting corresponds to a frequency conversion and a transformation to two complex signals (i.e. an in-phase signal and a quadrature signal). Setting to zero can be performed in a very simple and computing-efficient manner. Further, the processing effort is kept low by alternately weighting with two values inverse to each other, and rounding errors are minimized. Apart from this, it should be noted that the first in-phase output signal and the second in-phase output signal each only have half the data rate of the first digitalized output signal, so that an overall data rate is not increased compared to the digitalized output signal when generating the first in-phase output signal and the first quadrature output signal.

Further, the present invention provides a method according to claim 24.

Apart from this, it should be noted that further advantageous embodiments of the present invention are defined by the dependent claims.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
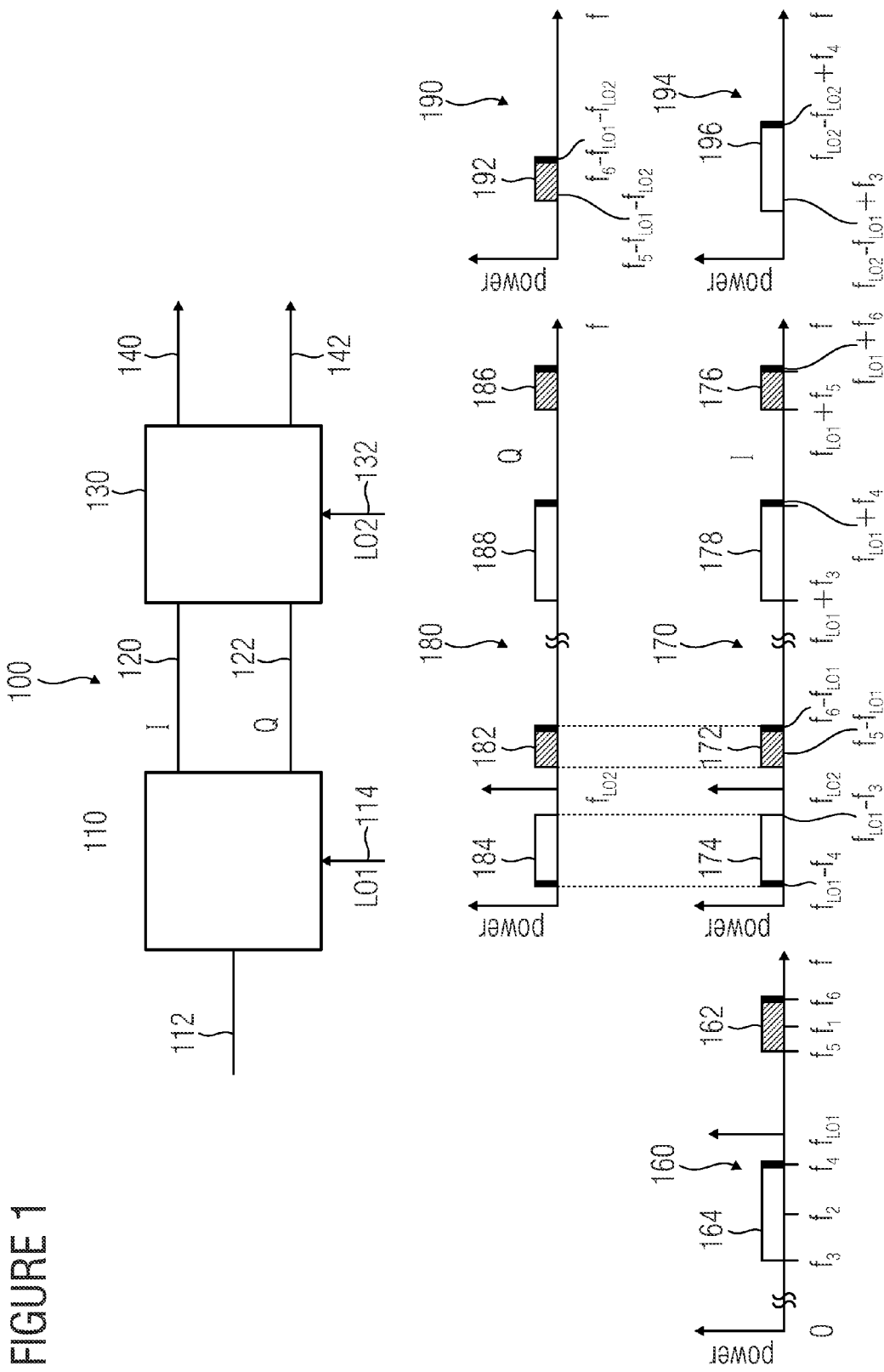
FIG. 1 is a block diagram of an inventive signal processor according to an embodiment of the present invention, together with an illustration of the resulting frequency relations.

FIG. 1 shows a block diagram of an inventive signal processor for processing a receiving signal having a first usable frequency band and a second usable frequency band according to an embodiment of the present invention. The signal processor according to FIG. 1 is designated by 100 in its entirety. A first mixer 110 receives a receiving signal 112 as well as a first local oscillator signal 114. The first mixer 110 is implemented to mix the receiving signal 112 with the first local oscillator signal, wherein a frequency of the first local oscillator signal is asymmetrical between the first usable frequency band and the second usable frequency band. The first mixer 110 is implemented to generate an in-phase signal 120 (I) and a quadrature signal 122 (Q). Further, the signal processor 100 comprises a second mixer 130, which is implemented to receive the in-phase signal 120, the quadrature signal 122 and a second local oscillator signal 132. Here, a frequency of the second local oscillator signal 132 is selected such that the mixed image of the first usable frequency band and the mixed image of the second usable frequency band with regard to the second local oscillator signal are at least partly image bands of each other. Apart from this, the second mixer is implemented to provide a first output signal 140 at its output, which substantially comprises information content of the first usable frequency band, and to further provide a second output signal 142, which substantially comprises information content of the second usable frequency band. In other words, the mixer 130 is implemented to provide two output signals 140, 142 at its outputs, which include information content of the first usable frequency band and the second usable frequency band in a separate manner.

Based on the above structural description, the mode of operation of the signal processor 100 will be described below. Here, particularly the spectra of the occurring usable signals or the images generated therefrom, respectively, are used for explanation.

In the following, the usable frequency bands included in the receiving signal 112 will be discussed at first based on a spectral representation 160. Additionally, it should be noted that the spectral representations discussed below are not according to scale. However, frequency relations ("larger, smaller, in-between") in the spectral representations typically correspond to actually resulting frequency relations.

Further, it should be noted that in the spectral representations, one frequency each is plotted on an abscissa, while an ordinate shows a spectral power density, which is not according to scale, as it is known from signal representation.

According to the spectral representation 160, the receiving signal 112 comprises a first usable frequency band 162. Here, the first usable frequency band 162 can be seen as a frequency band whose information content is to be made available for further processing by the inventive signal processor. Further, the receiving signal 112 comprises a second usable frequency band 164, whose information content is also to be made available at an output for further processing by the inventive signal processor.

Further, it should be noted that in the spectral representations of FIG. 1, the first frequency band 162 as well as its images resulting from the mixtures are shaded, while the second frequency band 164 and its images are not shaded. Further, it should be noted that a frequency upper end of the first frequency band 162 is indicated by a thick line and that further a frequency upper end of the second frequency band 164 is also indicated by a thick line. Further, it should be noted that the first frequency band 162 has a lower frequency limit $f_5$ and an upper frequency limit $f_6$. In other words, the first usable frequency band 162 extends from the frequency $f_5$ to the frequency $f_6$ (the frequencies $f_5$ and $f_6$ included). Further, a frequency $f_1$ indicates a center frequency of the first frequency band 162. Thus, the frequency $f_1$ is, for example, the average value of the frequencies $f_5$ and $f_6$.

The second frequency band 164 has a lower frequency limit at the frequency $f_3$ and further an upper frequency limit at the frequency $f_4$. In other words, the second usable frequency band 164 extends between the frequency $f_3$ and the frequency $f_4$. Further, the second usable frequency band 164 has a central frequency $f_2$, wherein the central frequency $f_2$ of the second frequency band 164 is, for example, equal to an average value of the cutoff frequencies $f_3$ and $f_4$.

Below, it will be assumed that it is the object of the signal processor 100 to provide the information content of the first frequency band 162 and the second frequency band 164 at the outputs 140, 142 for further processing, and that, apart from that, the signal processor 100 is coupled to an evaluation means, which is implemented to evaluate the information content of the first usable frequency band 162 and the second usable frequency band 164 either simultaneously or one after the other.

One frequency of the first local oscillator signal 114 is indicated by $F_{LO1}$, and is selected to be asymmetrical between the first frequency band 162 and the second frequency band 164. In other words, the frequency $f_{LO1}$ of the first local oscillator signal 114 is asymmetrical between the center frequency $f_1$ of the first frequency band 162 and the center frequency $f_2$ of the second frequency band 164 and/or asymmetrical between the lower cutoff frequency $f_5$ of the first usable frequency band 162 and the upper cutoff frequency $f_4$ of the second usable frequency band 164.

The first mixer 110 is implemented to mix the receiving signal with the first local oscillator signal 114 for obtaining the in-phase signal 120 and the quadrature signal 122. In other words, the mixer 110 is implemented to mix the receiving signal 112 with two versions of the first local oscillator signal 114 phase shifted to each other, wherein the phase shift between the phase-shifted versions of the first local oscillator signal 114 is typically between 70 degrees and 110 degrees and ideally 90 degrees. In other words, the mixer 110 is implemented to generate the in-phase signal by mixing the receiving signal 112 with a first version of the local oscillator signal 114, and to generate the quadrature signal 122 by mixing with a second version of the local oscillator signal shifted by 90 degrees compared to the first version of the local oscillator signal 114.

A spectral representation 170 shows the signal portions included in the in-phase signal 120, and a spectral representation 180 shows the spectral portions included in the quadrature signal 122.

The mixer 110 is implemented to generate the in-phase signal 120 such that the in-phase signal has a first signal portion that is a mixed image of the first usable frequency band 162, and that the in-phase signal 120 further has a second signal portion that is a mixed image of the second usable frequency band 164. The first signal portion, i.e. the image of the first usable frequency band 162 is indicated by 172 in the spectral representation 170. Apart from this, the first signal portion 172 is a down-mixed image of the first usable frequency band 162. Correspondingly, the first signal portion 172 has a lower cutoff frequency of $f_5-f_{LO1}$ as well as an upper cutoff frequency of $f_6-f_{LO1}$.

The second signal portion, which is a mixed image of the second usable frequency band 164 is indicated by 174 in the spectral representation 170. Since the frequency of the first local oscillator signal $f_{LO1}$ is typically above the second usable frequency band 164, inversion of the frequency occurs during generation of the image 174, as it is known from communications engineering. The second signal portion 174 has a lower cutoff frequency of $f_{LO1}-f_4$ and an upper cutoff frequency of $f_{LO1}-f_3$.

Further, the spectral representation 170 shows further images of the first usable frequency band 162 and the second usable frequency band 164. For example, an upward-mixed image of the first usable frequency band 162 is indicated by 176 in the spectral representation 170. The upward-mixed image 176 of the first usable frequency band 162 has a lower cutoff frequency of $f_{LO1}+f_5$ and an upper cutoff frequency of $f_{LO1}+f_6$. Further, typically, an upward-mixed image 178 of the second usable frequency band 164 that has a lower cutoff frequency of $f_{LO1}+f_3$ and an upper cutoff frequency of $f_{LO1}+f_4$, results in the first mixer 110.

Apart from this, it should be noted that the down-mixed image 172 of the first usable frequency band 162 and the down-mixed image 174 of the second usable frequency band 164 are advantageously (but not necessarily) used for further signal processing. The upward-mixed image 176 of the first usable frequency band 162 and the upward-mixed image 178 of the second usable frequency band 164 can, for example, be included in the in-phase signal 120. However, it is advantageous that a low pass filter in the first mixer 110 filters out, for example, the upward-mixed images 176, 178 of the first usable frequency band 162 and the second usable frequency band 164, or attenuates the same compared to the down-mixed images 172, 174. Such an optional low pass filter can also alternatively be included in the input of the second mixer 130.

A spectrum of the quadrature signal 122 does not differ significantly from a spectrum of the in-phase signal 120 with regard to spectral energy distribution. The spectrum of the quadrature signal 122 is, moreover, shown in a spectral representation 180. The quadrature signal 122 comprises a first signal portion 182, which corresponds to the first signal portion 172 in the in-phase signal 120, and which represents a down-mixed image of the first usable frequency band 162. Further, the quadrature signal 122 comprises a second signal portion 184, which corresponds to the second signal portion 174 of the in-phase signal 120, and which represents a down-mixed image of the second usable frequency band 164. Further, the quadrature signal 122 comprises an upward-mixed image 186 of the first usable frequency band 162, as well as an upward-mixed image 188 of the second usable frequency band 164.

Apart from this, it should be noted that the frequency of the first local oscillator signal 114 is selected to be asymmetrical between the first usable frequency band 162 and the second usable frequency band 164, in order to ensure that the first signal portion 172 in the in-phase signal 120 and the second signal portion 174 in the in-phase signal 120 do not overlap with regard to frequency. This is, for example, obtained when the following applies:

$$f_{LO1}<(f_3+f_5)/2, \text{ or } f_{LO1}>(f_4+f_6)/2.$$

Apart from this, it should be noted that the down-mixed image 172 of the first usable frequency band 162 can lie above or below the down-mixed image 174 of the second usable frequency band 164 with regard to frequency. This is independent of whether the frequency $f_{LO1}$ of the first local oscillator signal 114 is closer to the first usable frequency band 162 or closer to the second usable frequency band 164.

The second mixer 130 is further implemented to receive the in-phase signal 120 (or a filtered version of the same) and the quadrature signal 122 (or a filtered version of the same) and to mix them by using the second local oscillator signal 132. The frequency $f_{LO2}$ of the second local oscillator signal 132 is selected such that the mixed (or down-mixed, respectively) image 172 of the first usable frequency band 162 and the mixed (or down-mixed, respectively) image 174 of the second usable frequency band 164 are at least partly image bands of each other. In other words, the frequency $f_{LO2}$ of the second local oscillator signal 132 is selected such that the first signal portion 172 and the second signal portion 174 are imaged to at least partly overlapping frequency ranges by mixing using the second local oscillator signal. This is, for example, the case when the frequency intervals $[f_5-f_{LO1}-f_{LO2}; f_6-f_{LO1}-f_{LO2}]$ and $[f_{LO2}-f_{LO1}+f_3; f_{LO2}-f_{LO1}+f_4]$ overlap. Alternatively, the condition is also fulfilled when the frequency intervals $[f_{LO2}-f_{LO1}-f_4; f_{LO2}-f_{LO1}-f_3]$ and $[f_{LO2}+f_{LO1}-f_6; f_{LO2}+f_{LO1}-f_5]$ overlap.

For example, it is advantageous to select a frequency in the middle between the center of the first signal portion 172 and the center of the second signal portion 174 for the frequency $f_{LO2}$ of the second local oscillator signal 132. In one selection, the following applies:

$$f_{LO2}=\tfrac{1}{2}((f_5+f_6-2f_{LO1})/2+(2f_{LO1}-f_3-f_4)/2).$$

A deviation of ±20% is tolerable in this example.

In a further embodiment, the frequency $f_{LO2}$ of the second local oscillator signal 132 is selected such that the following applies:

$$f_{LO2}=(f_5-f_3)/2.$$

Here, also, a deviation of ±20%, but advantageously not more than ±10%, is tolerable.

In a further embodiment, the frequency $f_{LO2}$ is selected such that the following applies:

$$f_{LO2}=(f_6-f_4)/2.$$

Here, a deviation of the frequency $f_{LO2}$ of the second local oscillator signal from an ideal value by ±20%, but advantageously not more than ±10%, is tolerable.

Further, it should be noted that the inventive concept is advantageously used in narrow band transmission systems, where the following applies:

$$f_4 - f_3 \leq 0{,}1(f_3+f_4)/2,$$

or advantageously $$f_4 - f_3 \leq 0{,}01(f_3+f_4)/2$$

and $$f_6 - f_5 \leq 0{,}1(f_5+f_6)/2,$$

or advantageously $$f_6 - f_5 \leq 0{,}1(f_5+f_6)/2.$$

Thus, the second mixer 130 is implemented to mix the above-described in-phase signal 120 and the above-described quadrature signal 122 with the second local oscillator signal 132. Further, the second mixer 130 is implemented to perform mixing such that signals in which the information content of the first usable frequency band 162 and the second usable frequency band 164 are included separate from each other are applied to the first output 140 and the second output 142. In other words, the first output signal 140, for example, substantially includes the information content of the first usable frequency band 162 is included, while in the first output signal 142 the information content of the second usable frequency band 164 is suppressed or attenuated with regard to the information content of the first usable frequency band 162, respectively. The second output signal 142, however, substantially includes the information content of the second usable frequency band 164, while in the second output signal 142 the information content of the first usable frequency band 162 is suppressed or attenuated with regard to the information content of the second usable frequency band.

This can be obtained by the first mixer 130, for example by mixing the in-phase signal 120 and the quadrature signal 122 with the second local oscillator signal 132, and a subsequent combination of the signals resulting from the second mixing. Due to the fact that the first signal portion 172 and the second signal portion 174 in the in-phase signal 120 or the first signal portion 182 and the second signal portion 184 in the quadrature signal 122, respectively, are at least partly image bands of each other, the mentioned signal portions can be imaged to a very low intermediate frequency by common processing, wherein otherwise the first signal portions 172, 182 and the second signal portions 174, 184 are imaged to a low intermediate frequency range, which eases the subsequent digital processing. A spectral representation 190 describes, for example, the information content of the first output signal 140. The first output signal 140 includes substantially the information content of the first usable frequency band 162. The information content of the first usable frequency band 162 is mixed down to a low intermediate frequency, so that, for example, a maximum frequency occurring in the first output signal 140 is at most twice the bandwidth of the first usable frequency band 162 or the second usable frequency band 164. In an analog manner, the second output signal 142 substantially includes the information content of the second usable frequency band 164, mixed down to a low second intermediate frequency. In other words, a highest frequency occurring in the second output signal 142 is advantageously not larger than twice the bandwidth of the first usable frequency band 162 or the second usable frequency band 164.

Further, it should be noted that the second intermediate frequency is defined, for example, as the band center of the image of the first usable frequency band 162 in the first output signal 140. Alternatively, the second intermediate frequency is defined as the band center of the image 196 of the second usable frequency band 164 in the second output signal 142. A tolerance of ±20% is allowable with regard to these definitions.

Further, the frequency $f_{LO1}$ of the first local oscillator signal 114 and the frequency $f_{LO2}$ of the second local oscillator signal 132 are selected such that the band center of the image 192 of the first usable frequency band 162 in the first output signal 140 deviates with regard to the frequency by no more than 20% (but advantageously no more than 10%) from a band center of the image 196 of the second usable frequency band 164 in the second output signal 142.

Further, it should be noted that basically the output signals 140, 142 can be provided by using different (complex) mixer architectures. Apart from using a Weaver architecture, alternatively, for example, a Hartley topology can be used. Other circuit structures are possible for obtaining output signals based on the in-phase signal 120 and the quadrature signal 122, where the information content of the usable frequency bands exist separately.

Figure 2:
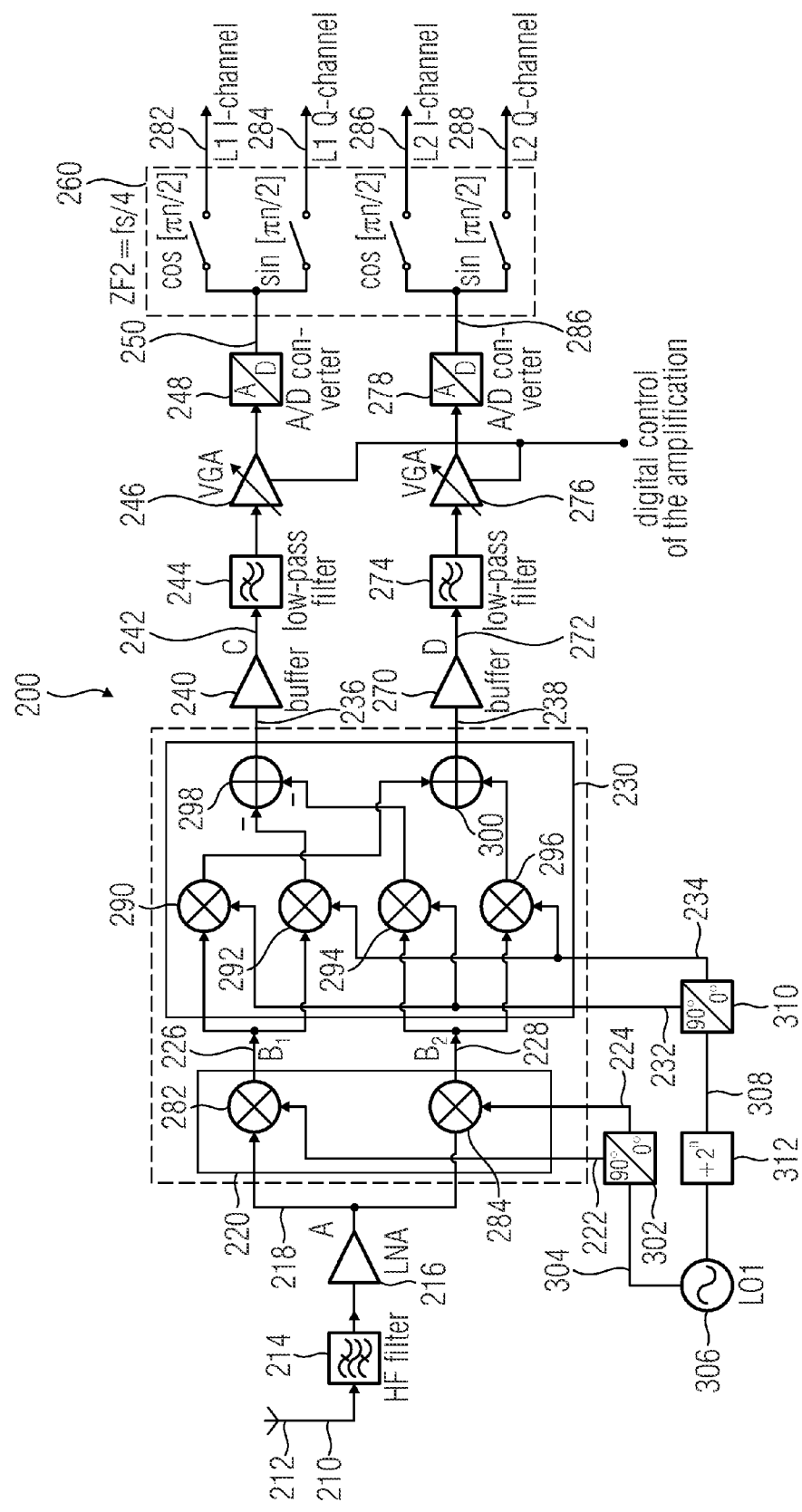
FIG. 2 is a block diagram of an inventive signal processor according to an embodiment of the present invention.

Based on the above functional description of the signal processor 100, an example of a specific implementation of the inventive signal processor will be described below based on FIG. 2. Therefore, FIG. 2 shows a block diagram of an inventive signal processor according to an embodiment of the present invention. The signal processor according to FIG. 2 is indicated by 200 in its entirety.

The signal processor 200 receives an input signal 210, for example from a multiband antenna 212. The multiband antenna 212 is implemented, for example, for receiving frequencies of the first usable frequency band 162 and the second usable frequency band 164. Further, the signal processor 200 comprises an (optional) high-frequency filter 214 receiving the receiving signal 210, and which is implemented to let the first usable frequency band 162 and the second usable frequency band 164 pass, and to attenuate, for example, frequencies lying outside the first usable frequency band 162 and the second usable frequency band 164.

An (optional) low noise amplifier 216 (LNA) receives a signal generated by the high-frequency filter 214 based on the input signal 210 and amplifies the same. The low noise amplifier 216 provides a receiving signal 218, which is also designated by A. Further, the signal processor 200 comprises a first mixer 220. The first mixer 220 receives the receiving signal 218 as well as, further, at least one local oscillator signal 222. However, it is advantageous that the first mixer 220 receives two local oscillator signals 222, 224 shifted by at least 90 degrees (or in a range between 70 degrees and 110 degrees) from each other. Thus, based on the receiving signal 218 and the local oscillator signals 222, 224, the first mixer 220 generates an in-phase signal 226 (also designated by $B_1$) as well as a quadrature signal 228 (also designated by $B_2$). A second mixer 230 receives the in-phase signal 226 and the quadrature signal 228, as well as, further, at least one second local oscillator signal 232. Advantageously, the second mixer 232 receives two local oscillator signals 232, 234 phase shifted from each other by at least 90 degrees (or in a range between 70 degrees and 110 degrees, respectively). Based on the in-phase signal 226, the quadrature signal 228 and the two local oscillator signals 232, 234, the second mixer 230 generates a first output signal 236 as well as a second output signal 238. The first output signal 236 serves as an input signal for a buffer amplifier or buffer 240, respectively. The output signal of the buffer is designated by 242 or B, respectively. Further, the output signal 242 of the buffer 240 is passed to a low pass filter 244. An output signal of the low pass filter 244 is further supplied to a variable gain amplifier 246. An output signal of the variable gain amplifier 246 is further supplied to an analog/digital converter 248. The analog/digital converter 248 provides a digitalized, time-discrete and value-discrete signal 250 for digital post-processing 260. The second output signal 238 of the first mixer 230 is supplied to a second buffer 270. An output signal 272 (also designated by D) of the second buffer 270 is further supplied to a second variable gain amplifier 276 via a second low pass filter 274, as a high-frequency input signal. A high-frequency output signal of the second variable gain amplifier 276 is further supplied to a second analog/digital converter 278 as an analog input signal. Based on the analog input signal, the second analog/digital converter 278 provides a second digitalized signal 280 for digital further processing 260. The digital post-processing or further processing 260, respectively, generates a first in-phase output signal 282 and a first quadrature output signal 284 based on the first digital signal 250. The first in-phase output signal 282 and the first quadrature output signal 284 describe substantially the information content of the first usable frequency band 162. Further, post-processing 260 generates a second in-phase output signal 286 and a second quadrature output signal 288 based on the second digitalized signal 280. The second in-phase output signal 286 and the second quadrature output signal 288 describe substantially the information content of the second usable frequency band 164.

Based on the structural overview over the circuitry 200, the structure of the first mixer 220 as well as the second mixer 230 will be described in detail below.

The first mixer 220 includes an in-phase mixer 282 as well as a quadrature mixer 284. The in-phase mixer 282 receives the receiving signal 218 as a first input signal, and further the local oscillator signal 222 as a second input signal. The in-phase mixer 282 provides the in-phase signal 226 as an output signal. Apart from the pure mixer functionality, the in-phase mixer 282 can include, for example, a filter and/or an impedance matching means, in order to output, as the in-phase signal 226, for example only the down-mixed image 172 of the first usable frequency band 162 and the down-mixed image 174 of the second usable frequency band (but not the upward-mixed image 176, 178, or only in an attenuated manner).

Like the in-phase mixer 282, the quadrature mixer 284 receives the receiving signal 218 as a first input signal. Further, the quadrature mixer 284 receives the local oscillator signal 224 as a second input signal. Further, the quadrature mixer 284 provides the quadrature signal 228 as an output signal. Like the in-phase mixer 282, the quadrature mixer 284 can also comprise a filter functionality, for example for outputting only the down-mixed images 182, 184 of the first usable frequency band 162 and the second usable frequency band 164.

The second mixer 230 comprises a first mixer assembly 290, a second mixer assembly 292, a third mixer assembly 294 and a fourth mixer assembly 296. The first mixer assembly 290 receives the in-phase signal 226 as a first input signal and the local oscillator signal 232 as a second input signal. The second mixer assembly 292 receives the in-phase signal 226 as a first input signal and the local oscillator signal 234 as a second input signal. The third mixer assembly 294 receives the quadrature signal 228 as a first input signal and the local oscillator signal 232 as a second input signal. The fourth mixer assembly 296 receives the quadrature signal 228 as a first input signal and the local oscillator signal 234 as a second input signal.

In other words, the second mixer assembly 292 and the fourth mixer assembly 296 receive the same local oscillator signal 234. The first mixer assembly 290 and the third mixer assembly 294 further receive the same local oscillator signal 232.

Further, the second mixer 230 comprises a first combiner 298 as well as a second combiner 300. The first combiner or summer 298, respectively, receives an output signal of the second mixer assembly 292 as well as an output signal of the third mixer assembly 294. The first combiner 298 is implemented to combine or add or sum, respectively, the output signal of the first mixer assembly 292 and the output signal of the third mixer assembly 294 with the same, advantageously negative signs. The first combiner or adder or summer 298, respectively, forms the first output signal 236 as an output signal, i.e. as a result of the addition or summation, respectively. The second combiner or adder or summer 300, respectively, receives an output signal of the first mixer assembly 290 as a first input signal as well as an output signal of the fourth mixer assembly 296 as a second input signal. The combiner or adder or summer 300, respectively, is implemented to respectively add or sum the output signals of the first mixer assembly 290 and the fourth mixer assembly 296 with the same (advantageously positive) signs. The second combiner or adder or summer 300, respectively, provides the result of the addition or summation, respectively, as the second output signal 238.

Further, it should be noted that the local oscillator signal 22 is ideally phase shifted by 90 degrees (generally in a range between 70 degrees and 110 degrees) to the local oscillator signal 224. This shift is, for example, obtained by a phase shifter 302, which is implemented to derive the local oscillator signals 222, 224 from a first local oscillator signal 304 by applying a phase shift. In other words, the phase shifter 302 is implemented to receive the first local oscillator signal 304 from a first local oscillator 306, and to generated the local oscillator signals 224, 224 based thereon. For example, the phase shifter 302 can be implemented to generate the local oscillator signal 224 as a version of the first local oscillator signal 304 shifted by zero degrees or a copy of the same, and to generate the second local oscillator 222 as a copy or version of the first local oscillator signal 304 shifted by 90 degrees.

Further, it is advantageous to derive the local oscillator signals 232, 234 from a second local oscillator signal 208 by a phase shifter 310. In other words, the phase shifter 310 is implemented to receive the second local oscillator signal 308 and to provide the local oscillator signal 234 as a version or a copy, respectively, of the second local oscillator signal 308 phase shifted by zero degrees. Further, the phase shifter 310 is implemented to provide the local oscillator signal 232 as a version or a copy, respectively, of the second local oscillator signal 308 phase shifted by 90 degrees.

Apart from this, it is advantageous to derive the second local oscillator signal 308 by a frequency divider 312 from an output signal of the first local oscillator 306, for example from the first local oscillator signal 304. Thereby, the frequency divider 312 is implemented to obtain a frequency division ratio of $2^n$. In other words, the frequency divider 312 receives a signal having the frequency of the first local oscillator signal 304 and divides the frequency of the same by $2^n$, wherein the following applies: $n \geq 1$. Thereby, it is achieved that the two local oscillator signals 304, 308 are derived from a single local oscillator, the first local oscillator 306. Consequently, the local oscillator signals 222, 224, 232, 234 are phase-locked to each other.

Further, it should be noted that the adjustment of the amplification of the amplifiers 246, 276 is performed by digitally controlling the amplification. Controlling the amplification is performed in a synchronized manner in the two amplifiers 246, 276 by a common control signal.

Post-processing 260 further performs a quadrature sampling of the digitalized signals 250, 280. Here, a sampling frequency $f_s$ corresponds to the fourth-fold of a second intermediate frequency, to which the first usable frequency band 162 and the second usable frequency band 164 are imaged by the second mixer 230.

With regard to quadrature sampling, it is assumed that the first analog/digital converter 248 and the second analog/digital converter 278 are implemented to sample or convert, respectively, the output signals provided by the amplifiers 246, 276 at times $n \times T_s$ (wherein $T_s = 1/f_s$). Here, it is assumed that n represents an integer and that a phase shift can exist between sampling by the first analog/digital converter 248 and by the second analog/digital converter 278, but does not have to. For generating the first in-phase output signal 282, the first in-phase output signal 282 is set to zero when the following applies: $\cos(\pi n/2) = 0$. If, however, $\cos(\pi n/2) = \pm 1$ applies, samples from the digitalized signal 250 are provided as the first in-phase output signal 282. In other words, the first in-phase output signal 282 comprises only values for integer sample indices n.

Alternatively, the first in-phase output signal 282 can also be generated by multiplying the digitalized signal 250 by $\cos(\pi n/2)$, wherein n, as described above, describes a time index of the samples.

In a comparable manner, the first quadrature output signal 284 is generated by setting values of the first quadrature output signal for integer values of the sample index n to zero and by outputting samples of the first digitalized signal 250 as the first quadrature output signal 284 for odd values of the sample index n.

Apart from this, the quadrature output signal 284 can also be generated by multiplying the samples of the first digitalized signal 250 by $\sin(\pi n/2)$ (or by $-\sin(\pi n/2)$).

Setting the values to zero during the determination of the first in-phase output signal 284 and the first quadrature output signal 284 can also be replaced by removing the respective values.

The determination of the second in-phase output signal 286 and the second quadrature output signal 288 based on the second digitalized signal 280 takes place in the same manner as generating the first in-phase output signal 284 and the first quadrature output signal 284 based on the first digitalized signal 250.

Figure 3:
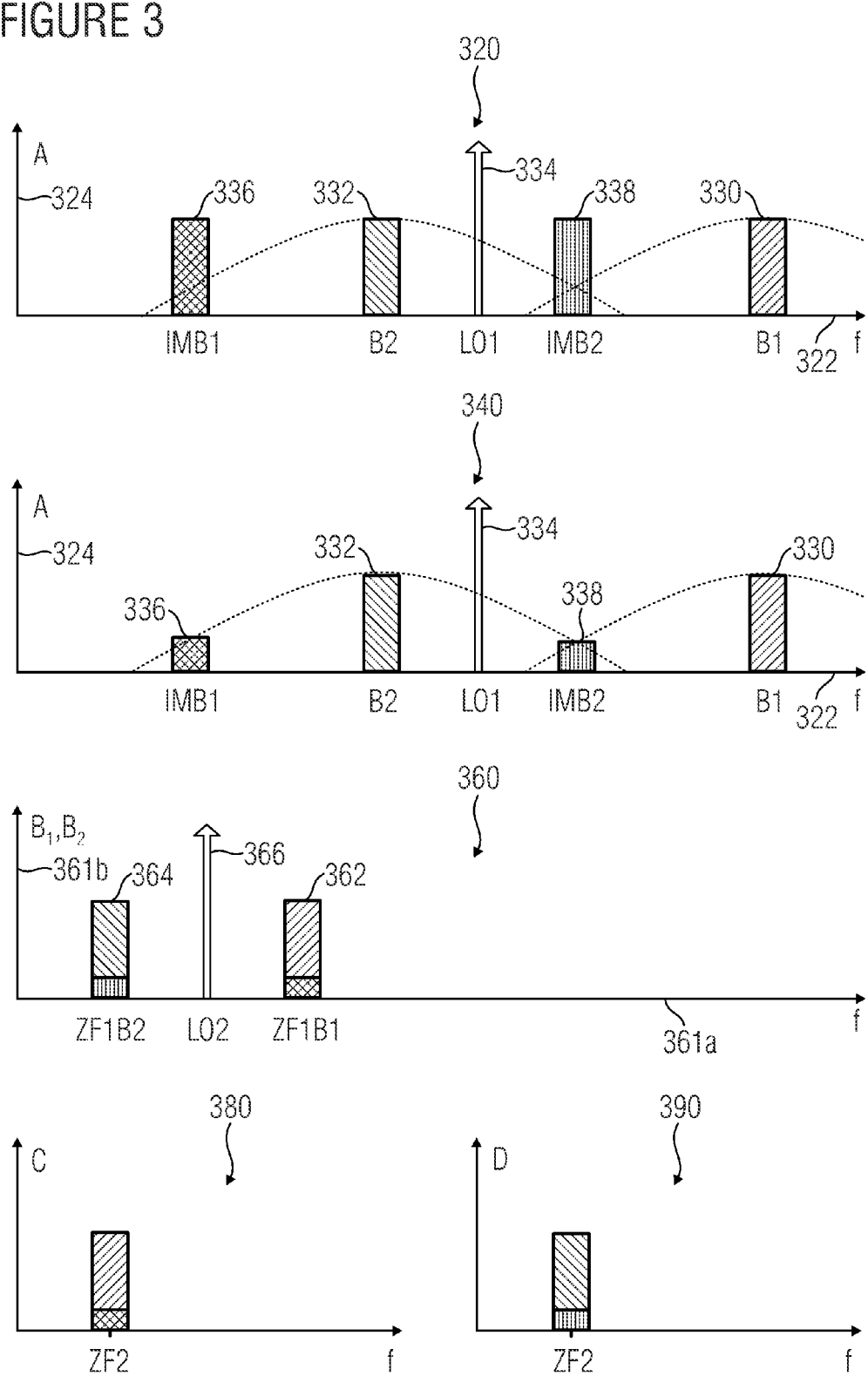
FIG. 3 is a schematic illustration of a frequency plan during operation of an inventive signal processor.

FIG. 3 shows a spectral representation of different signals in the signal processor 200. A first spectral representation 320 describes a spectrum of the receiving signal 218 (also indicated by Signal A) as it results without input-side image frequency suppression filter (for example without high-frequency filter 214). The frequency is plotted on an abscissa 322, while an ordinate 324 shows, for example, a spectral power density. The spectral representation 320 shows a first usable frequency band 330 (also indicated by B1), a second usable frequency band 332 (also indicated by B2), a first local oscillator signal 334 (also indicated by LO1), a first image frequency band 336 (also indicated by IMB1) as well as a second image frequency band 338 (also indicated by IMB2). The first image frequency band 336 is an image frequency band of the first useful frequency band 330 with regard to the first local oscillator signal 334, and the second image frequency band 338 is an image frequency band of the second usable frequency band 332 with regard to the first local oscillator signal 334. In other words, the first usable frequency band 330 and the first image frequency band 336 are frequency-symmetrical with regard to the frequency of the first local oscillator signal 334. Further, the second usable frequency band 332 and the second image frequency band 338 are frequency-symmetrical with regard to the frequency of the first local oscillator signal 334.

For illustration purposes, it is assumed that the first usable frequency band 330, the second usable frequency band 332, the first image frequency band 336 and the second image frequency band 338 have the same amplitude or spectral amplitude distribution, respectively.

A spectral representation 340 shows a spectrum of the receiving signal 218 (Signal A) for the case that the high-frequency filter 214 attenuates image frequency bands 336 (INB1) or 338 (INB2), respectively. In other words, according to the spectral representation 340, the image frequency bands 336, 338 have a lower amplitude compared to the usable frequency bands 330, 332.

A spectral representation 360 shows a spectrum of the in-phase signal 226 ($B_1$) or the quadrature signal 228 ($B_2$). Again, the frequency is plotted on an abscissa 361a, while an ordinate 361b shows a spectral power density. The spectral representation 360 shows an image 362 of the first usable frequency band 330 and the first image frequency band 336. In other words, the first usable frequency band 330 and the associated first image frequency band 336 are imaged to the same frequency ranges by mixing with the first local oscillator 334. Further, the spectral representation 360 shows an image 364 of the second usable frequency band 332 and the associated second image frequency band 338.

Further, the spectral representation 360 shows the second local oscillator signal 366. The first image 362 and the second image 364 are (at least partly) image bands of each other with regard to the second local oscillator signal 366. In other words, the first image 362 and the second image 364 are frequency-symmetrical with regard to the frequency of the second local oscillator signal 366 (at least approximately).

A spectral representation 380 shows a spectrum of the output signal 242 at the output of the buffer amplifier 240 (also indicated by C). A spectral representation 390 shows a spectrum of the output signal 272 at the output of the second buffer amplifier 270 (also indicated by D). The output signal 242 at the output of the first buffer amplifier 240 substantially comprises information content of the first usable frequency band 330 (as well as, in attenuated form, a signal portion of the first image frequency band 336 as a parasitic signal). The output signal 272 at the output of the second buffer amplifier 270 comprises substantially information content of the second usable frequency band 332 (and, in attenuated form, a signal portion of the second image frequency band 338 as a parasitic portion).

Additionally, it should be noted that the signal 242 at the output of the first buffer amplifier 240 as well as the signal 272 at the output of the second buffer amplifier 270 substantially comprise signal portions at a second intermediate frequency. In other words, the image of the first usable frequency band 330 in the output signal 242 comprises the second intermediate frequency (ZF2) (or is around the second intermediate frequency). The image of the second usable frequency band 332 in the output signal 272 also comprises the second intermediate frequency ($ZF_2$) or is around the second intermediate frequency, respectively.

Additionally, it should be noted that the first usable frequency band 330 according to FIG. 3 corresponds to the first usable frequency band 162 according to FIG. 1. Additionally, the second usable frequency band 332 according to FIG. 3 corresponds to the second usable frequency band 164 according to FIG. 1.

In summary, it can be stated that the presented invention represents a receiver architecture reducing power consumption of high-precision broadband receivers. The receiver architecture according to FIGS. 1 and 2 can, for example, be used for simultaneously receiving two bands of a certain navigation system (e.g. L1 and L2c from CPS, or L5 and L6 from GALILEO), but also for simultaneously receiving bands from different systems. FIG. 3 shows a simplified frequency process within the modified Weaver architecture or within the modified Weaver image frequency suppression mixers, respectively. FIG. 2 shows an architecture of the presented broadband double-conversion low-intermediate frequency dual-receiver. In other words, FIG. 2 shows an architecture of an inventive receiver using an inventive signal processor.

B1 and B2 represent the desired bands (e.g. usable frequency bands), and IMB1 and IMB2 represent the respective image bands. A frequency at which the image bands lie depends on a selection of the frequency LO1 of the first local oscillator signal 304. Two (for example) independent pre-selected filters (implemented, for example, in the HF filter 214), select the first usable frequency band 330 (B1) and the second usable frequency band 332 (B2). In the presented frequency process or the presented selection of frequencies, the frequency LO1 of the first local oscillator signal is implemented together for the first usable frequency band B1 and the second usable frequency band B2, and lies between the two usable frequency bands 330, 332. An exact frequency LO1 of a first local oscillator signal 304 is still not determined. The frequency LO1 of the first local oscillator signal is to be selected, on the one hand, such that the suppression (for example realized by the high-frequency filter 214) ensured by the pre-selection filters (for example of the image bands 336, 338) is maximized. On the other hand, during the selection of the frequency LO1 of the first local oscillator signal 304 (or the frequency of the first local oscillator 306, respectively) the power of interferers is to be considered. If, for example, the frequency response of both pre-selection filters (for suppressing the image bands) centered on the respective center frequency is the same, maximum suppression is obtained when the first local oscillator LO1 (or the frequency of the first local oscillator, respectively) is at three-quarters of one band and one quarter of the other (see FIG. 3).

Thus, it is advantageous that the high-frequency filter 240 comprises a combination of two band pass filters or a combined band pass filter, respectively, wherein the band pass filter as a whole has a first pass band, wherein the first usable frequency band 330 lies in the center of the same. Further, it is advantageous that the band pass filter as a whole has a second frequency pass band, wherein the second useful frequency band 332 lies in the center of the same. Further, it is advantageous that a 10 dB bandwidth (but advantageously a 20 dB bandwidth or a 40 dB bandwidth) of the first pass band is smaller than a distance between the band centers of the first usable frequency band 330 and the second usable frequency band 332. Additionally, it is further advantageous that a 10 dB bandwidth (but advantageously a 20 dB bandwidth or a 40 dB bandwidth) of the second pass band is smaller than the distance between the band center of the first usable frequency band 330 and the second usable frequency band 332. In this case, sufficient suppression of image frequencies can be ensured. A particularly good image frequency suppression results when the frequency of the first local oscillator signal 334 is asymmetrical between the first usable frequency band 330 and the second usable frequency band 332, so that, for example, the frequency distance between a central frequency of the first usable frequency band 330 and the local oscillator signal 334 is three times a frequency distance between the central frequency of the second usable frequency band 332 and the local oscillator signal 334.

The receiver 200 can comprise, for example, a single path with a dual antenna 212, a pre-selection filter 214 and a low-noise amplifier 216 (LNA). Alternatively, the receiver can also comprise two paths with normal (e.g. single-band) antennas, filters and amplifiers adapted for the respective band. After the first complex frequency conversion (by the first mixer), B1 at $ZF_{1B1}$ and B2 at $ZF_{1B2}$ are mixed down to a common second intermediate frequency $ZF_2$ with the second local oscillator signal $LO_2$. Therefore, the frequency of the second local oscillator signal $LO_2$ is in the center between $ZF_{1B1}$ and $ZF_{1B2}$, so that B1 and B2 are a second image band of each other. The second frequency conversion is performed by a dual complex mixer (for example the second mixer 230). The four real signals (i.e. the four output signals of the first mixer assembly 290, the second mixer assembly 292, the third mixer assembly 294 and the fourth mixer assembly 296) are added in pairs (in the combiners or adders or summers 298, 300, respectively), wherein B1 and B2 are separate from each other. The second local oscillator signal $LO_2$ can be generated from the first local oscillator signal $LO_1$, for example by a simple digital frequency divider. In this way, the described dual frequency conversion of two different bands can be performed by a single frequency synthesizer.

The real B1 and B2 are at a low second $ZF_2$, which is slightly above half of the largest bandwidth between B1 and B2. Thereby, the power consumption of the variable gain amplifiers 246, 276 and the analog/digital converter 248, 278 is maximally optimized.

The above-described receiver topology suppresses the two image signals from dual frequency conversion by a modified Weaver topology, an innovative frequency planning (that considers both bands as images or image bands of each other during the second frequency conversion) and a single frequency synthesizer. Thus, the receiver topology is highly power-optimized and contributes to minimizing the current consumption of the variable gain amplifiers 246, 276 and the analog/digital converters 248, 278.

In the described architecture, the analog/digital converter 248, 278 performs no frequency conversion by sub-sampling, since the second intermediate frequency $ZF_2$ is already as small as it can be with regard to the largest bandwidth of B1 and B2.

Finally, B1 and B2 are mixed down by a simple quadrature sampling at $f_s/2$ into a base band, wherein $f_s$ represents the sampling rate of the analog/digital converter 248, 278. Therefore, the sampling rate $f_s$ is four times higher than the second intermediate frequency $ZF_2$, which is not critical in the presented architecture, thanks to the minimum second intermediate frequency $ZF_2$. At a ratio between the second intermediate frequency $ZF_2$ and the sampling rate according to $ZF_2=f_s/4$, the quadrature sampling results in B1 and B2 in the base band as complex signals without analog inaccuracies and at a data rate of $f_s/2$ for every channel.

An analog dual frequency conversion allows a minimum second intermediate frequency $ZF_2$. This allows again that no sub-sampling is necessitated. By this, an anti-aliasing function of the filtering can be realized prior to the variable gain amplifier 246, 276 (VGA) by a low pass 244, 274. This is a great advantage for applications that are very sensitive with regard to group run-time changes. This is very critical at large bandwidths.

In the following, the improvements and advantages compared to the prior art will be described, which result due to the inventive signal processor or the inventive receiver topology, respectively. The receiver topology presented here is a dual band receiver and needs less components than two independent receivers. Compared to other dual receivers, the topology presented here suppresses both image frequencies originating from a dual-stage frequency conversion. A great advantage is that the current consumption is not increased when suppressing broader image signals. This is, for example, not the case if a Hartley topology is used which is based on complex active band passes.

The inventive topology can be large-scale-integrated and allows implementation in the form of a single chip solution. For example, the first mixer 220 and the second mixer 230 can be monolithically integrated on a chip in silicon semiconductor technology. Further, optionally, the buffers 240, 270, the low pass filters 244, 274, the amplifiers 246, 276, the analog/digital converters 248, 278 and/or the post-processor 260 can be monolithically integrated on the same chip. Optionally, further, for example the amplifier 216 and/or the generation of the local oscillator signals (consisting of the local oscillator 306, the frequency divider 312 as well as the phase shifters 302, 310) can be integrated monolithically on the chip. Additionally, for example, the mixers 220, 230 can be implemented actively or passively with diodes or with transistors. For example, CMOS technology or a gallium-arsenide technology can be used.

Additionally, the described topology includes a highly power-optimized implementation. This is due to the fact that only a single frequency synthesizer is necessitated and the second intermediate frequency $ZF_2$ can be at a minimum. Further, the suppression of the second image signal does not need an in-phase path (I) and a quadrature path (Q) for every band, which would double the number of filters and variable gain amplifiers (VGAs). This would be the case if the alternative Hartley topology were used for suppressing the second image band.

It should be noted that receiver topologies exist that suppress both image signals but necessitate a lot of current and are very band-limited. Further, it should be noted that other receivers exist that consume less power but suppress only one of both image bands. The inventive topology combines the strengths of both conventional topologies in a large-scale-integrated or large-scale-integratable solution, respectively, wherein the image band suppression is independent of the signal bandwidth. Both image signals are suppressed within a Weaver topology due to innovative frequency planning. Other large-scale-integrated or large-scale-integratable topologies necessitate a Weaver architecture for performing the separation of the desired bands (first image signal) and a Hartley topology after the separation for extracting the second image signal from both bands. Therefore, both signals are necessitated in a complex form, which necessitates four filters and VGAs. Due to the inventive separation of both bands at the second and not at the first frequency conversion, it is sufficient in the described topology to work with real and non-complex paths for the separated bands. Another possibility is to suppress the second image band in a digital range. This is not possible in a dual receiver or only with great difficulties, since this would necessitate mixing of already separated bands.

It should be noted that a new and efficient topology for implementing a dual-band receiver is based on a common first intermediate frequency (ZF). On the one hand, this selection has the effect that both bands are image bands of each other. On the other hand, the HF band selection provides no image band suppression, since both received bands are added to each other after the respective filtering and low-noise amplification. These two factors result in the need for a receiver architecture performing image band suppression. However, the suppression can be kept low since, as a spread spectrum, the image band can be considered only as thermal noise. This eases the integratability of the architecture. For optimizing the bandwidth of a variable gain amplifier (VGA) and a clock frequency of an analog/digital converter (ADU), it is desirable to set the bands at an intermediate frequency (ZF), which corresponds approximately to half the bandwidth (of the usable frequency bands). The first intermediate frequency (ZF) is determined by the frequency separation between both bands, no matter how broad the bands are. Normally, the first intermediate frequency (ZF) is significantly larger than half of the bandwidths of the usable frequency bands. Thus, additional frequency conversion is necessitated for obtaining the second intermediate frequency (ZF). This results in the disadvantage that the also occurring image band has to be suppressed. The suppression can, for example, be realized by a complex active band pass filter. However, the described solution is limited with regard to the bandwidth, since the current consumption of such a complex filtering increases strongly with the frequency. For that reason, only small to medium bandwidths (approx. 2-5 MHz) are taken into consideration for mobile architectures.

In other words, the inventive receiver architecture is based on the above-described architecture and represents a further development of the above-described architecture.

In the following, the object solved by the present invention will be outlined again briefly. With the invention presented here, future very broadband mobile receivers that are large-scale-integratable and consume little power can be built for high-precision positioning systems. For combining a dual band architecture and the reception of very large bands, two image frequencies are suppressed in a broadband manner. The presented receiver or the presented receiver architecture, respectively, places a single first oscillator (LO1) asymmetrically between both bands, which results in two different intermediate frequencies and correspondingly in two image signals. The suppression of the two image bands is performed by a selectivity of pre-selection filters. An exact selection for the frequency of the first local oscillator or the first oscillator LO1, respectively, is performed, for example, for obtaining maximum attenuation of the first image bands. The second oscillator or the frequency of the second local oscillator, respectively, is in the center of the two intermediate frequencies $ZF_{1B1}$ and $ZF_{1B2}$. Thereby, the two desired bands are two image bands of each other and can be separated from each other by a modified Weaver image frequency suppression mixer. In the described topology, both bands are at a low common second intermediate frequency ($ZF_2$), which significantly reduces the power consumption of the variable gain amplifier and the analog/digital converter (ADU).

Thus, the described dual topology with dual conversion enables integrating an inexpensive single chip receiver in CMOS technology.

Figure 4:
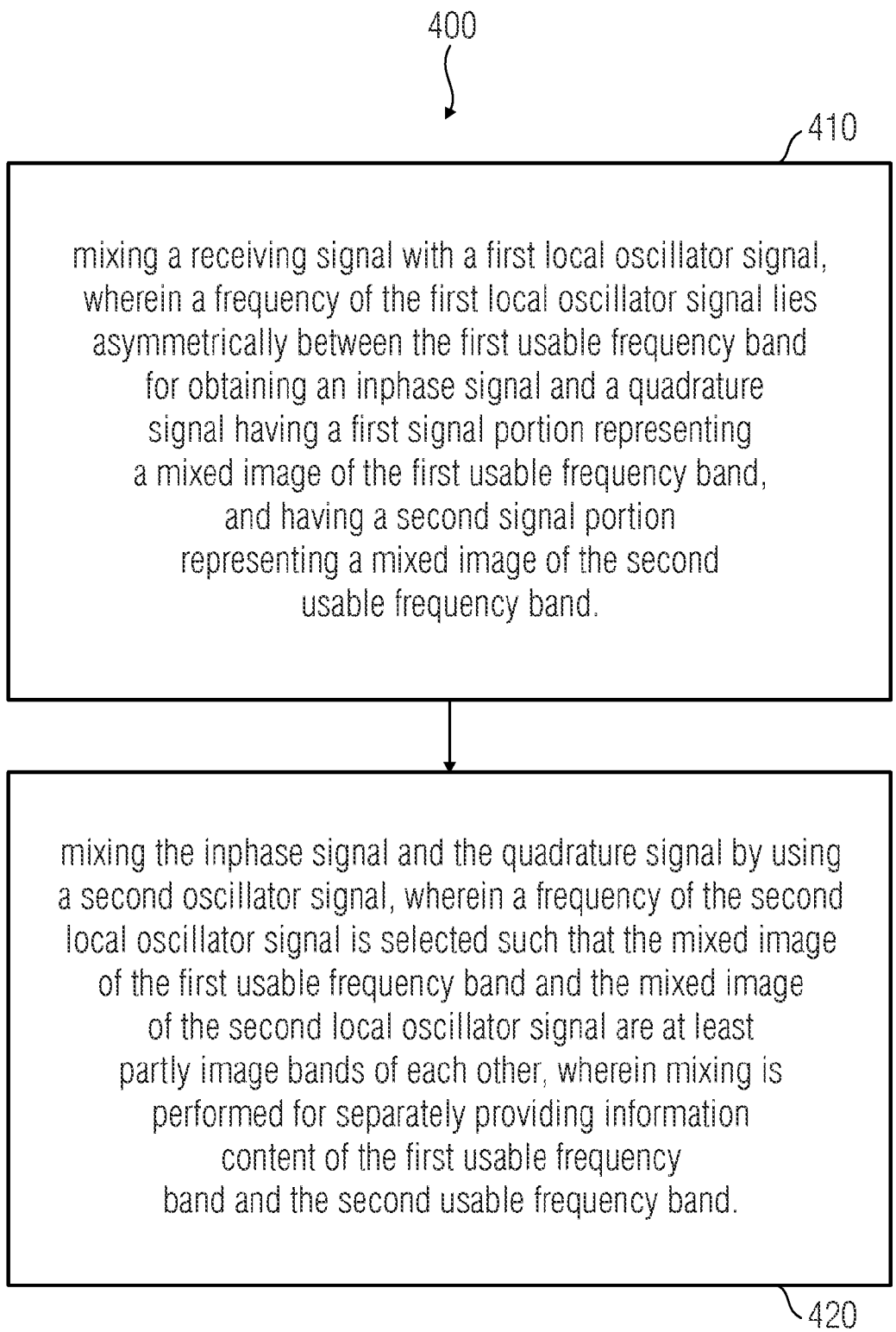
FIG. 4 is a flow diagram of an inventive method for processing a receiving signal.

Additionally, FIG. 4 shows an inventive method for processing a receiving signal having a first usable frequency band and a second usable frequency band. The method according to FIG. 4 is designated by 400 in its entirety. In a first step 410, the method 400 comprises mixing a receiving signal comprising the first usable frequency band and the second usable frequency band with a first local oscillator signal, wherein a frequency of the first local oscillator signal is asymmetrical between the first usable frequency band and the second usable frequency band for obtaining an in-phase signal and a quadrature signal having a first signal portion representing a mixed image of the first usable frequency band, and having a second signal portion representing a mixed image of the second usable frequency band.

Further, in a second step 420, the method 400 comprises mixing the in-phase signal and the quadrature signal by using a second local oscillator signal. A frequency of the second local oscillator signal is selected such that the mixed image of the first usable frequency band and the mixed image of the second usable frequency band are at least partly image bands of each other with regard to the second local oscillator signal. Mixing is further performed for separately providing information content of the first usable frequency band and the second usable frequency band.

Further, the method 400 can be complemented by all those steps performed by the described signal processor.

In summary, it can be said that the present invention provides a broadband dual-conversion low-intermediate frequency dual-receiver. The presented dual conversion receiver suppresses both image frequencies independent of the bandwidth of the two received bands. The suppression of the first image signal is performed by attenuating the pre-selection filter and by intelligent frequency planning for the first frequency conversion. The second local oscillator lies between both desired bands, so that the desired bands are image bands of each other after the first frequency conversion. The separation of both bands is performed by a modified second stage of a Weaver mixer for image frequency suppression. The advantages of this architecture are the possibility for implementing a high-precision, broadband and power-optimized receiver. Further, the inventive receiver architecture is completely (monolithically) integratable.

Thus, the present invention enables, for example, the structure of high-precision dual receivers for positioning systems. The present invention can be used, for example, in a GPS dual receiver, in a GALILEO dual receiver, in a GLONASS dual receiver of in a GNSS dual receiver. The innovative frequency planning allows suppression of both image bands with only a single image band suppression, which saves a lot of power. Thus, a large-scale-integratable dual receiver topology results, which is not limited by the signal bandwidth with regard to image band suppression.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A signal processor for processing a receiving signal with a first usable frequency band and a second usable frequency band for obtaining two output signals, comprising:

a first mixer for mixing the receiving signal with a first local oscillator signal, wherein a frequency of the first local oscillator signal is asymmetrical between the first usable frequency band and the second usable frequency band, and wherein the first mixer is implemented to acquire an in-phase signal and a quadrature signal with a first signal portion representing a mixed image of the first usable frequency band and with a second signal portion representing a mixed image of the second usable frequency band; and a second mixer for mixing the in-phase signal and the quadrature signal using a second local oscillator signal, wherein a frequency $f_{LO2}$ of the second local oscillator signal is selected such that the mixed image of the first usable frequency band generated by the first mixer and the mixed image of the second usable frequency band generated by the first mixer are at least partly image bands of each other with regard to the second local oscillator signal, wherein the second mixer is implemented to separately provide information content of the first usable frequency band and the second usable frequency band at its output in order to acquire a first output signal, which substantially comprises information content of the first usable frequency band, and to acquire a second output signal, which substantially comprises information content of the second usable frequency band, and a frequency $f_3$ describes a lower band limit of the second usable frequency band, wherein a frequency $f_4$ describes an upper band limit of the second usable frequency band, wherein a frequency $f_5$ describes a lower band limit of the first usable frequency band, wherein, for a frequency $f_{LO1}$ of the first local oscillator signal, the following two conditions are fulfilled:

$f_4 \leq f_{LO1} \leq f_5$, and $f_{LO1} \leq (f_3+f_5)/2$; and wherein further the following holds:

$f_3 \leq f_4 \leq f_5$.

2. The signal processor according to claim 1, wherein the signal processor further comprises a band pass filter, which is implemented to provide the receiving signal based on at least one input signal, and which is further implemented to let the first usable frequency band and the second usable frequency band pass, and to attenuate frequency bands adjacent to the first usable frequency band and the second usable frequency band more than the usable frequency bands.

3. The signal processor according to claim 2, wherein the band pass filter is implemented to let the first usable frequency band pass in an unattenuated manner or with low attenuation, and to attenuate an image frequency band belonging to the first usable frequency band more than the first usable frequency band with regard to a frequency of the first local oscillator signal, and wherein the band pass filter is implemented to let the second usable frequency band pass in an unattenuated manner or with low attenuation, and to attenuate an image frequency band belonging to the second usable frequency band more than the second usable frequency band with regard to the frequency of the first local oscillator signal.

4. The signal processor according to claim 1, wherein the frequency of the first local oscillator signal is selected such that the first usable frequency band and the second usable frequency band are imaged to non-overlapping or separate frequency bands by the first mixer.

5. The signal processor according to claim 1, wherein the first usable frequency band is an L1 band of a GPS positioning system, and wherein the second usable frequency band is an L2 band of the GPS positioning system; or wherein the first usable frequency band is a first band of a GALILEO positioning system, and wherein the second usable frequency band is a second band of the GALILEO positioning system.

6. The signal processor according to claim 1, wherein the frequency of the second local oscillator signal is selected such that the frequency of the second local oscillator signal lies between an image of the first usable frequency band, to which the first mixer images the first usable frequency band by mixing down, and an image of the second usable frequency band, to which the mixer images the second usable frequency band by mixing down.

7. The signal processor according to claim 1, wherein the frequency of the second local oscillator signal is selected such that the frequency of the second local oscillator signal differs from an average value between a center frequency of the first signal portion and a center frequency of the second signal portion by 20% at the most.

8. The signal processor according to claim 1, wherein the first mixer comprises an in-phase mixer and a quadrature mixer,
 wherein the in-phase mixer is implemented to receive the receiving signal and to image the same to the in-phase signal by performing frequency conversion,
 wherein the quadrature mixer is implemented to receive the receiving signal and to image the same to the quadrature signal by performing frequency conversion, and
 wherein the in-phase mixer and the quadrature mixer are implemented to receive local oscillator signals of the same frequency phase-shifted to each other, which are both based on the first local oscillator signal,
 wherein a phase shift between the local oscillator signals received from the in-phase mixer and the quadrature mixer lies in a range between 70 degrees and 110 degrees.

9. The signal processor according to claim 1, wherein the signal processor is implemented to generate the second local oscillator signal from the first local oscillator signal by a frequency divider, or to derive the first local oscillator signal and the second local oscillator signal from a common signal by a frequency synthesizer, such that the first local oscillator signal and the second local oscillator signal are at a predetermined fixed frequency ratio to each other.

10. The signal processor according to claim 1, wherein the first mixer and the second mixer are implemented to process analog value-continuous and time-continuous input signals and local oscillator signals and to output signals in a value-continuous and time-continuous representation.

11. The signal processor according to claim 1, wherein the first mixer and the second mixer are realized in CMOS technology.

12. The signal processor according to claim 1, wherein the first mixer and the second mixer are monolithically integrated on a chip.

13. A signal processor for processing a receiving signal with a first usable frequency band and a second usable frequency band for obtaining two output signals, comprising:
 a first mixer for mixing the receiving signal with a first local oscillator signal, wherein a frequency of the first local oscillator signal is asymmetrical between the first usable frequency band and the second usable frequency band, and wherein the first mixer is implemented to acquire an in-phase signal and a quadrature signal with a first signal portion representing a mixed image of the first usable frequency band and with a second signal portion representing a mixed image of the second usable frequency band; and
 a second mixer for mixing the in-phase signal and the quadrature signal using a second local oscillator signal, wherein a frequency $f_{LO2}$ of the second local oscillator signal is selected such that the mixed image of the first usable frequency band generated by the first mixer and the mixed image of the second usable frequency band generated by the first mixer are at least partly image bands of each other with regard to the second local oscillator signal,
 wherein the second mixer is implemented to separately provide information content of the first usable frequency band and the second usable frequency band at its output in order to acquire a first output signal, which substantially comprises information content of the first usable frequency band, and to acquire a second output signal, which substantially comprises information content of the second usable frequency band, and
 wherein, between a frequency $f_1$ describing a band center of the first usable frequency band and a frequency $f_2$ describing a band center of the second usable frequency band and the frequency $f_{LO1}$ of the first local oscillator signal, one of the following relations holds:

$$f_2+0.15(f_1-f_2) \leq f_{LO1} \leq f_2+0.35(f_1-f_2)$$

or $$f_2+0.65(f_1-f_2) \leq f_{LO1} \leq f_2+0.85(f_1-f_2),$$

wherein the frequency $f_2$ is smaller than the frequency $f_1$.

14. The signal processor according to claim 13, wherein the frequency $f_{LO1}$ is outside the first usable frequency band and outside the second usable frequency band.

15. A signal processor for processing a receiving signal with a first usable frequency band and a second usable frequency band for obtaining two output signals, comprising:
 a first mixer for mixing the receiving signal with a first local oscillator signal, wherein a frequency of the first local oscillator signal is asymmetrical between the first usable frequency band and the second usable frequency band, and wherein the first mixer is implemented to acquire an in-phase signal and a quadrature signal with a first signal portion representing a mixed image of the first usable frequency band and with a second signal portion representing a mixed image of the second usable frequency band; and
 a second mixer for mixing the in-phase signal and the quadrature signal using a second local oscillator signal, wherein a frequency $f_{LO2}$ of the second local oscillator signal is selected such that the mixed image of the first usable frequency band generated by the first mixer and the mixed image of the second usable frequency band generated by the first mixer are at least partly image bands of each other with regard to the second local oscillator signal,
 wherein the second mixer is implemented to separately provide information content of the first usable frequency band and the second usable frequency band at its output in order to acquire a first output signal, which substantially comprises information content of the first usable frequency band, and to acquire a second output signal, which substantially comprises information content of the second usable frequency band, and
 wherein a frequency $f_4$ describes an upper band limit of the second usable frequency band, wherein a frequency $f_5$ describes a lower band limit of the first usable frequency band, wherein a frequency $f_6$ describes an upper band limit of the first usable frequency band, wherein, for a frequency $f_{LO1}$ of the first local oscillator signal, the following two conditions are fulfilled:

$$f_4 \leq f_{LO1} \leq f_5, \text{ and}$$

$$f_{LO1} \geq (f_4+f_6)/2; \text{ and}$$

wherein further the following holds:

$$f_4 \leq f_5 \leq f_6.$$

16. A signal processor for processing a receiving signal with a first usable frequency band and a second usable frequency band for obtaining two output signals, comprising:

a first mixer for mixing the receiving signal with a first local oscillator signal, wherein a frequency of the first local oscillator signal is asymmetrical between the first usable frequency band and the second usable frequency band, and wherein the first mixer is implemented to acquire an in-phase signal and a quadrature signal with a first signal portion representing a mixed image of the first usable frequency band and with a second signal portion representing a mixed image of the second usable frequency band; and a second mixer for mixing the in-phase signal and the quadrature signal using a second local oscillator signal, wherein a frequency $f_{LO2}$ of the second local oscillator signal is selected such that the mixed image of the first usable frequency band generated by the first mixer and the mixed image of the second usable frequency band generated by the first mixer are at least partly image bands of each other with regard to the second local oscillator signal, wherein the second mixer is implemented to separately provide information content of the first usable frequency band and the second usable frequency band at its output in order to acquire a first output signal, which substantially comprises information content of the first usable frequency band, and to acquire a second output signal, which substantially comprises information content of the second usable frequency band, and wherein the second mixer comprises a first mixer assembly, a second mixer assembly, a third mixer assembly, a fourth mixer assembly, a first combiner and a second combiner, wherein the first mixer assembly is implemented to receive the in-phase signal and a local oscillator signal associated to the first mixer assembly, and to generate an output signal associated to the first mixer assembly;

wherein the second mixer assembly is implemented to receive the in-phase signal and a local oscillator signal associated to the second mixer assembly, and to generate an output signal associated to the second mixer assembly;

wherein the third mixer assembly is implemented to receive the quadrature signal and a local oscillator signal associated to the third mixer assembly, and to generate an output signal associated to the third mixer assembly;

wherein the fourth mixer assembly is implemented to receive the quadrature signal and a local oscillator signal associated to the fourth mixer assembly, and to generate an output signal associated to the fourth mixer assembly;

wherein the first combiner is implemented to combine the output signal of the second mixer assembly with the output signal of the third mixer assembly for acquiring the first output signal;

wherein the second combiner is implemented to combine the output signal of the first mixer assembly with the output signal of the fourth mixer assembly for acquiring the second output signal;

wherein the local oscillator signals of the first mixer assembly and the third mixer assembly differ by 20 degrees at the most with regard to their phase position;

wherein the local oscillator signals of the second mixer assembly and the fourth mixer assembly differ by 20 degrees at the most with regard to their phase position; and wherein the local oscillator signals of the first mixer assembly and the third mixer assembly comprise a phase shift in a range between 70 degrees and 110 degrees compared to the local oscillator signals of the second mixer assembly and the fourth mixer assembly.

17. The signal processor according to claim 16, wherein the local oscillator signal of the first mixer assembly is equal to the local oscillator signal of the third mixer assembly; and wherein the local oscillator signal of the second mixer assembly is equal to the local oscillator signal of the fourth mixer assembly.

18. The signal processor according to claim 16, wherein the first combiner is a first summer, which is implemented to sum the output signals of the second mixer assembly and the third mixer assembly with the same sign for acquiring the first output signal; and wherein the second combiner is a second summer, which is implemented to sum the output signals of the first mixer assembly and the fourth mixer assembly with the same sign for acquiring the second output signal.

19. A signal processor for processing a receiving signal with a first usable frequency band and a second usable frequency band for obtaining two output signals, comprising:

a first mixer for mixing the receiving signal with a first local oscillator signal, wherein a frequency of the first local oscillator signal is asymmetrical between the first usable frequency band and the second usable frequency band, and wherein the first mixer is implemented to acquire an in-phase signal and a quadrature signal with a first signal portion representing a mixed image of the first usable frequency band and with a second signal portion representing a mixed image of the second usable frequency band; and a second mixer for mixing the in-phase signal and the quadrature signal using a second local oscillator signal, wherein a frequency $f_{LO2}$ of the second local oscillator signal is selected such that the mixed image of the first usable frequency band generated by the first mixer and the mixed image of the second usable frequency band generated by the first mixer are at least partly image bands of each other with regard to the second local oscillator signal, wherein the second mixer is implemented to separately provide information content of the first usable frequency band and the second usable frequency band at its output in order to acquire a first output signal, which substantially comprises information content of the first usable frequency band, and to acquire a second output signal, which substantially comprises information content of the second usable frequency band, wherein the signal processor is implemented to sample the first output signal or a signal derived therefrom with a sampling frequency and to convert the same in an analog/digital manner for acquiring a first digitalized signal, and to sample the second output signal or a signal derived there from with the sampling frequency and to convert the same in an analog/digital manner for acquiring a second digitalized signal, and wherein the sampling frequency deviates by 20% at the most from a four-fold of a second intermediate frequency to which the second mixer images the image of the first usable frequency band and the image (of the second usable frequency band.

20. The signal processor according to claim 19, wherein the second intermediate frequency is defined as a center frequency of a signal portion in the first output signal generated by down-mixing the image of the first usable frequency band by the second mixer, or as a center frequency of a signal portion in the second output signal generated by down-mixing the image of the second usable frequency band by the second mixer.

21. The signal processor according to claim 19, wherein the signal processor is implemented to mix the first digitalized signal down to a base band and to mix the second digitalized signal down to a base band.

22. The signal processor according to claim 19, wherein the signal processor is implemented to submit the first digitalized output signal to quadrature sampling by setting every second sample of the first digitalized output signal to zero or removing the same, and by weighting the other samples alternately with a first predetermined value (+1) and a second predetermined value (−1), for acquiring a first in-phase output signal, wherein the first predetermined value (+1) and the second predetermined value (−1) are inverse to each other, and by setting every second sample of the first digitalized output signal to zero or removing the same, offset in time by one sampling step to the calculation of the first in-phase output signal, and by weighting the other samples alternately with a third predetermined value (+1) and a fourth predetermined value (−1), for acquiring a first quadrature output signal, wherein the third predetermined value (+1) and the fourth predetermined value (−1) are inverse to each other.

* * * * *

UNITED STATES PATENT AND TRADEMARK OFFICE
CERTIFICATE OF CORRECTION

PATENT NO. : 8,503,958 B2
APPLICATION NO. : 12/305689
DATED : August 6, 2013
INVENTOR(S) : Carrera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this
Fifteenth Day of September, 2015

Michelle K. Lee
*Director of the United States Patent and Trademark Office*